(12) United States Patent
Darmour et al.

(10) Patent No.: US 9,111,085 B1
(45) Date of Patent: Aug. 18, 2015

(54) COMPUTER-IMPLEMENTED SYSTEM AND METHOD FOR ELECTRONIC PERSONAL IDENTITY VERIFICATION

(71) Applicant: Girling Kelly Design Group, LLC, Seattle, WA (US)

(72) Inventors: Jennifer Amy Darmour, Seattle, WA (US); Jeffrey Gelfuso, Bellevue, WA (US); Robert Marcus Girling, Woodinville, WA (US); Shyam Sujeewa Habarakada, Seattle, WA (US)

(73) Assignee: Girling Kelly Design Group, LLC, Seattle, WA (US)

( * ) Notice: Subject to any disclaimer, the term of this patent is extended or adjusted under 35 U.S.C. 154(b) by 24 days.

(21) Appl. No.: 14/034,397

(22) Filed: Sep. 23, 2013

Related U.S. Application Data

(60) Provisional application No. 61/704,443, filed on Sep. 21, 2012.

(51) Int. Cl.
*G06F 21/00* (2013.01)
*G06F 21/35* (2013.01)
*G06F 21/32* (2013.01)

(52) U.S. Cl.
CPC ............... *G06F 21/35* (2013.01); *G06F 21/32* (2013.01)

(58) Field of Classification Search
CPC ......... G06F 21/30; G06F 21/31; G06F 21/32; G06F 21/35
USPC .................. 713/186, 182; 382/115
See application file for complete search history.

(56) References Cited

U.S. PATENT DOCUMENTS

| | | | | |
|---|---|---|---|---|
| 2003/0113001 | A1* | 6/2003 | Kato et al. | 382/115 |
| 2003/0173408 | A1* | 9/2003 | Mosher et al. | 235/492 |
| 2003/0174049 | A1* | 9/2003 | Beigel et al. | 340/10.42 |
| 2006/0288233 | A1* | 12/2006 | Kozlay | 713/186 |
| 2007/0046476 | A1* | 3/2007 | Hinkamp | 340/573.1 |

* cited by examiner

*Primary Examiner* — Matthew Smithers
(74) *Attorney, Agent, or Firm* — Patrick J. S. Inouye; Leonid Kisselev

(57) ABSTRACT

A system and method for electronic personal identity verification is provided. A user is registered with an authentication service, which includes providing to the service a biometric signature associated with the user and information personally known to the user. Identification data that includes the biometric signature is sent from an identification device worn by the user to a user device associated with the user. An input personally known to the user is received into the user device. Encrypted credentials are sent from the user device to the authentication service. The received encrypted credentials are compared to the biometric signature and the information provided to the authentication service. A claims token is sent from the authentication service to the user device upon the encrypted credentials matching the biometric signature and the information provided to the authentication service. An application is accessed via a third party provider using the claims token.

19 Claims, 3 Drawing Sheets

10

20

30

| ID Name | PW | Dyn Key | Bio Sig |
|---------|-------|---------|---------|
| User #1 | xyzzy | 7734    | ∿∿      |

COMPUTER-IMPLEMENTED SYSTEM AND METHOD FOR ELECTRONIC PERSONAL IDENTITY VERIFICATION

CROSS-REFERENCE TO RELATED APPLICATION

This non-provisional patent application claims priority under 35 U.S.C. §119(e) to U.S. Provisional Patent Application Ser. No. 61/704,443, filed Sep. 21, 2012, the disclosure of which is incorporated by reference.

FIELD

The present invention relates in general to personal identify verification and, in particular, to a computer-implemented system and method for electronic personal identity verification.

BACKGROUND

Over the past decade, personal mobile computing devices, such as smart phones and tablet notebook, have become increasingly popular and capable, directly contributing to the already-widespread usage of wide area public data communications networks, such as the Internet. Software written for these devices, often simply called "apps," enables users of these devices to tap online resources virtually anywhere, whether to read Web pages, exchange emails or text messages, or to make purchases or transact business.

Frequently, online resources require the creation of an account with the third party responsible for the resource and access to the account generally requires user authentication, typically with a password. Banking institutions, for instance, require accountholders to set up a password and related-security features that help ensure that only authorized users are able to access an account online. Password protections remain the most popular form of online security. Almost two-thirds of consumers have five or more accounts with online services that require passwords, and almost one-third have ten or more password-protected online accounts. Of these consumers, over half of them often forget their passwords or use they use the same password for all of their accounts, which leads to a decrease in security and greater risk for fraudulent access and use.

Ensuring authorized access to online resources remains a challenge, yet online account compromise remains a pervasive problem that is worsening and that has been exacerbated by the proliferation of mobile computing devices, which can be lost or whose wireless communications can be intercepted. The identity and access management authentication market is currently estimated at $12.6B and growing annually, due to the increased need for online security to combat a rise in identities stolen or fraudulently used during transactions and online exchanges. Moreover, in the United States alone, approximately 15 million residents have their online identities used fraudulently each year with financial losses totaling upwards of $50B. Current approaches remain inadequate.

Accordingly, there is a need to provide improved online security access that better accommodates the realities of password protection and user fallibilities.

SUMMARY

Online security access can be improved through a personal wearable identification (ID) device that works in collaboration with an online security platform to seamlessly authenticate a user. Authentication combines information known about the user ("Something known"), attributes physical and unique to the user ("Something I am"), and possession of a physical article ("Something I have"). Here, "Something known"+"Something I am"+"Something I have"=most secure form of authentication. An authentication service is used to store user credentials and independently communicate with the wearable ID device and a user-operable reader device to ensure maximum and theft-proof security for identity authentication. In addition, the authentication services provide access to native and third party applications and services by "unlocking" additional capabilities.

In one embodiment, a system and method for electronic personal identity verification is provided. A user is registered with an authentication service, which includes providing to the authentication service a biometric signature associated with the user and information personally known to the user. Identification data that includes the biometric signature is sent from an identification device worn by the user to a user device associated with the user. An input personally known to the user is received into the user device. Encrypted credentials that include the user input and the identification data are sent from the user device to the authentication service. The received encrypted credentials are compared to the biometric signature and the information provided to the authentication service during the registration. A claims token is sent from the authentication service to the user device upon the encrypted credentials matching the biometric signature and the information provided to the authentication service during the registration. An application that requires user identity verification is accessed via a third party provider using the claims token.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
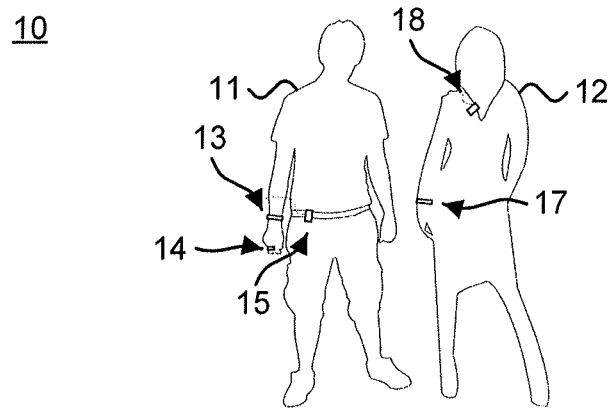
FIG. 1 is a diagram showing, by way of example, wearable identification (ID) devices.

Online security access can be improved through a personal wearable identification (ID) device that works in collaboration with an online security platform to seamlessly authenticate the user. Under this approach, authentication combines information known about the user ("Something known"), such as the user's name, attributes physical and unique to the user ("Something I am"), such as the user's heart rate or biometrics, and possession of a physical article ("Something I have"), such as a wearable ID device. The combination of these three entities leads to being the most secure form of authentication. FIG. 1 is a diagram 10 showing, by way of example, wearable ID devices 13-18. Each wearable ID device 13-18 is a form of lifestyle device that is designed to be worn on the body and against the skin of a user 11, 12 in a discrete way. Each wearable ID device 13-18 is available in various form factors, and is part of a collection of personal accessories that provides the user 11, 12 with different options on how the device is worn. The collection includes a wristband 13, ring 14, belt clip 15, bangle 17, and necklace 18. Other types of the wearable ID device, such as earrings, bandanas, and glasses (not shown) are possible. Each device is styled fashionably to reach a broader consumer market and can be considered a lifestyle accessory. Still, other types of form factors and personal accessories are possible.

Figure 2:
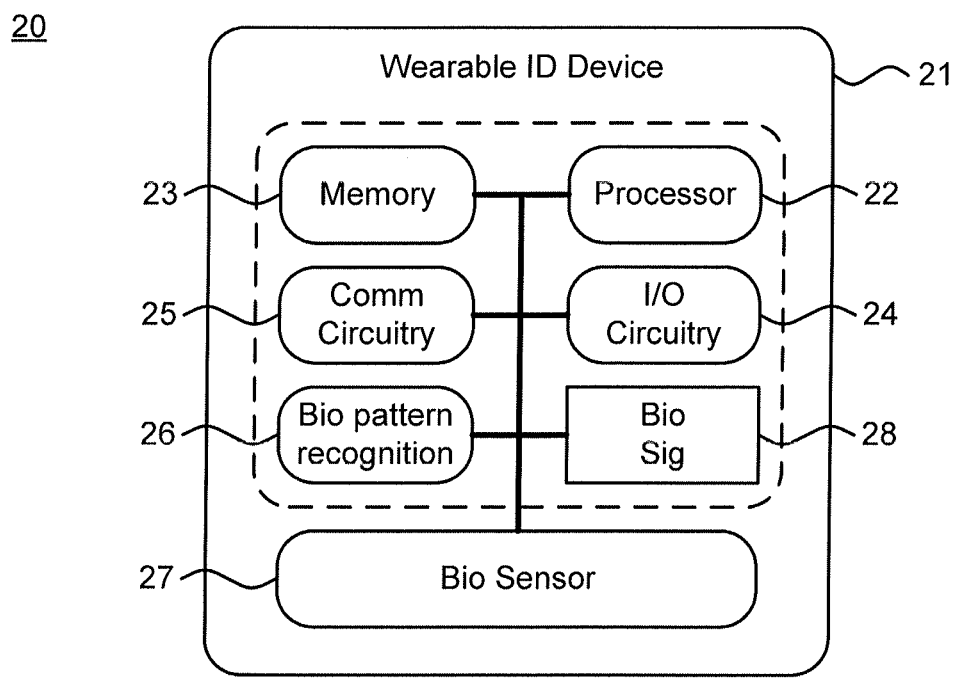
FIG. 2 is a functional block diagram showing the electronic components of the wearable ID devices of FIG. 1.

Each wearable ID device 13-18 includes integrated electronics components that combine biometrics with personal credentials to create unique ID data for the user 11, 12. FIG. 2 is a functional block diagram showing the electronic components 20 of the wearable ID devices 13-18 of FIG. 1. The electronic components 20 are powered by a battery or similar power source (not shown) provided within the housing 21 of the device 13-18. Internally, each wearable ID device 13-18 includes a processor 22, operating under programmable control, and memory 23 within which to store data and program instructions that can be implemented as modules. The processor 22 interfaces with input/output ("I/O") circuitry 24 and communications ("Comm") circuitry 25. The I/O circuitry 24 enables the processor 22 to receive biometric data from a biometric ("bio") sensor 27, while the communications circuitry 25 enables the device 13-18 to wirelessly communicate with an authentication service, as further described infra.

The biometric sensor 27 can be internally integrated within the housing 21 of the wearable ID device 13-18, or physically exposed on the outside of the housing 21. Internally-provided bio sensors 27 include sensors to detect internal user physiology, such as heart rate using a heart rate monitor or motion through an accelerometer. Externally-provided bio sensors 27 include sensors to detect and input physically-ascertainable indicia, such as a touchpad used to accept a fingerprint, a palm print, or a toe print or a digital image sensor to perform a retina scan. Other examples of bio sensors 27 are possible. For example, the bio sensor 27 can include a voice scanner to analyze a voice sample, a facial feature scanner, and a pad to accept a handwriting sample. Still other types of bio sensors are possible. For example, the bio sensor 27 can be capable of obtaining and analyzing a sample of the user's DNA, with a sequence of the user's DNA being the biometric data. Similarly, the bio sensor 27 can include a blood vessel pattern scanner, such as a finger vein recognition scanner, which can generate a pattern of the user's blood vessels by shining infrared light through the user's finger. Still other types of biometric sensors are possible.

The biometric data, as detected by the biometric sensor 27 and received into the processor 22 by way of the I/O circuitry 24, is used to create a biometric signature ("Bio Sig") 28 that is uniquely tied to the user 11, 12. The processor 22 applies biometric algorithmic pattern recognition ("Bio pattern recognition") module 26 to create the biometric signature 28 from the raw biometric data. For example, the heart rate and movement (gestures) can be read by the biometric sensor 27 and evaluate to determine a pattern in heart rate, using the biometric pattern recognition module 26, that is then turned into the biometric signature 28. Other algorithms to generate the biometric signature based on the biometric data can be used. The biometric signature 28 is then stored within the wearable ID device 13-18 for use in authenticating the user 11, 12, as further described infra.

Figures 3, 4:
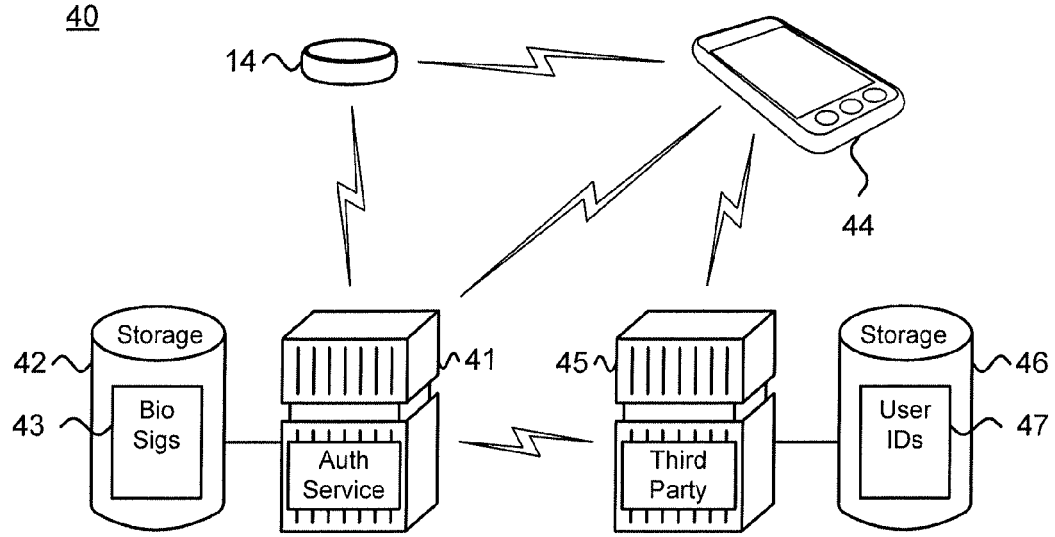
FIG. 3 is a block diagram showing the ID data maintained by the wearable ID devices of FIG. 1.
FIG. 4 is a block diagram showing a computer-implemented system for electronic personal identity verification, in accordance with one embodiment.

The processor 22 combines the user-unique biometric signature 28 with other user data to form ID data that is used to authenticate the user 11, 12 to third party applications and services. FIG. 3 is a block diagram showing the ID data 30 maintained by the wearable ID devices 13-18 of FIG. 1. The ID data 30 includes the user's name ("ID Name"), space to store an information personally known to the user ("PW"), such as a password or a pin, and key ("Dyn Key") dynamically generated by an authentication service upon successfully confirming the user's identity, plus the biometric signature 28. The password, or other information personally known information, is only known to the user 11, 12. The information is not stored as part of the ID data 30 and is neither stored nor transmitted to the wearable devices 13-18 at any time. Rather, the password is interactively provided by the user 11, 12 to a reader device at the time of a transaction and submitted only then to an authentication service, along with the other ID data 30. Other data can be included as part of the ID data 30, such as location, permissions, and so on. In one embodiment, the ID data 30 is structured in conformity with the OpenID standard of decentralized user authentication, such as described at http://openid.net, the disclosure of which is incorporated by reference.

The ID data 30 is used in collaboration with authentication services to verify the identity of the wearer of the device 13-18 and act as an additional level of personal security for unique authentication. FIG. 4 is a block diagram showing a computer-implemented system 40 for electronic personal identity verification, in accordance with one embodiment. An authentication service 41 provides theft-proof authentication of the wearer of the device 13-18 and facilitates access to third party online applications and services 45 to deliver contextual content, products, and offerings. A wearable ID device 13-18, such as the ring 14, initially interfaces with the authentication service 41, which maintains biometric signatures 43 in a coupled storage device 42. Thereafter, the wearable ID device 14 wirelessly connects to a reader device 44, such as a smart phone, tablet computer or card reader, that exchanges the ID data 30 with the authentication service 41, which provides a claims token to the reader device 44 that allows access to third party application and service providers 45, such as Amazon, Google, Facebook, Apple Store, and so forth. The third party providers 45 use the claims token to access user identifications 47 maintained in coupled storage devices 46.

The authentication service 41 and the third party provider 45 include components conventionally found in general purpose programming devices, such as central processing unit, memory, input/output ports, network interfaces, and non-volatile storage, although other components are possible. The authentication service 41 and the third party provider 45 are capable of executing computer code, which can be implemented as modules. Also, the reader device 44 can also include devices that are not permanently associated with a user 11, 12, but are operated by the user 11, 12, such as a parking meter. Still other types of user devices are possible as the reader device 44.

The claims token is an encrypted string of information, a claim, that only the issuer of token, the authentication service 41, can decrypt and interpret. The claim can be any piece of information, such as, for example, the username of the user 11, 12, though other kinds of information can be encrypted and used as a claim. In a further embodiment, the claims token can be tamper-proof, with the authentication service 41 being capable of recognizing that the token has been tampered with.

Figure 5:
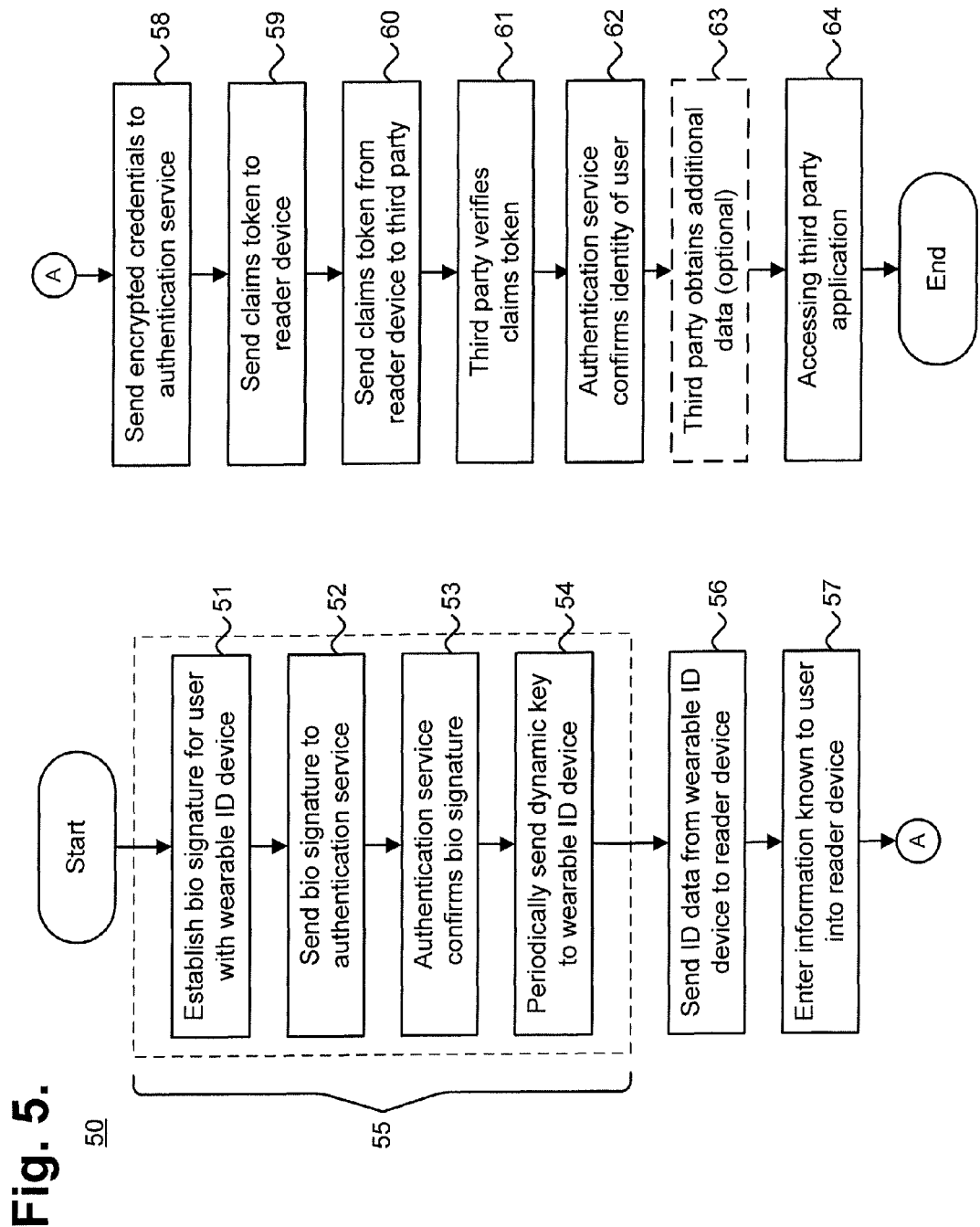
FIG. 5 is a flow diagram showing a computer-implemented method for electronic personal identity verification, in accordance with one embodiment.

The authentication service 41 is used to store user credentials and independently communicate with the wearable ID device 13-18 and the reader device 44 to ensure maximum and theft-proof security for identity authentication. In addition, the authentication service 41 provides access to native and third party applications and services 45 by "unlocking" additional capabilities based on user identification, permission, location, and the like. FIG. 5 is a flow diagram showing a computer-implemented method 50 for electronic personal identity verification, in accordance with one embodiment. Third party applications and services 45 include commerce transactions, payments and gifting, awards and loyalty programs, time-bound or temporary access, marking and tagging, push notifications, recommendations, as well as other applications and services. These value-added services are based on user behaviors, usage history, patterns and preferences.

Use of the wearable ID device 13-18 proceeds in two stages. During the initial setup stage 55, the user 11, 12 registers with the authentication service 41, as follows. First, the user 11, 12 establish biometric signature 28 with his or her device 13-18 (step 51). The device 13-18 then wirelessly sends the biometric signature 28, as well as other user-related information, such as the user's password or other information personally known to the user, to the authentication service 41 (step 52). The user 11, 12, either through the device 13-18, or through other ways, also provides to the authentication service 41 personal identifying data, such as the user's Social Security number, address, or date of birth, which the authentication service 41 can use to confirm that the bio signature 28 provided is associated with the user 11, 12. For example, if the user 11, 12 provides a Social Security number along with the bio signature 28, the authentication service can compare the Social Security number to numbers in an external or internal database. Based on the comparison, the authentication service 41 confirms that the biometric signature 28 is for the sending user 11, 12 (step 53). Upon successful user confirmation, the dynamic key is periodically generated and periodically sent to the wearable ID device 13-18 (step 54). The dynamic key can be generated based on a number of different variables, including the time and date of the generation of the key. The biometric signature 43 and the information personally known to the user provided to the authentication service during registration (not shown), as well as the dynamic key most recently sent to the wearable ID device 13-18 (not shown), are stored by the authentication service 41 at the coupled storage device 42.

During the second stage, the user 11, 12 uses the ID data 30 to access the third party applications and services 45. The user 11, 12 initiates the process by sending the ID data 30 from his or her device 13-18 to a reader device 44 (step 56). The user 11, 12 also enters the input, such as the password or other information personally known to the user 11, 12, into the reader device 44 (step 57), and the reader device 44 sends the encrypted credentials to the authentication service 41 (step 58). The authentication service 41 compares the sent encrypted credentials to data obtained for the user 11, 12 during the registration and to the dynamic key sent to the wearable ID device 13-18, and if the credentials match, sends a claims token to the reader device 44 (step 59). In turn, the reader device 44 sends the claims token to third party provider 45 (step 60). The third party provider 45 verifies the claims token with the authentication service 41 by sending the claims token to the authentication service 41 (step 61). The authentication service 41 compares the claims token provided by the third party provider 45 to the claims token provided to the reader device 44, and if the tokens match, the authentication service 41 confirms the identity of the requesting user 11, 12 to the third party provider 45 (step 62). The confirmation is done by sending a third party token to the third party provider 45. The third party token is a piece of encrypted information that serves as a proof to the third party provider 45 that the user's identity has been confirmed. The third party token is accompanied by information, readable to the third party provider 45, such as user's username, which allows the third party provider to identify the requesting user 11, 12 among the user identifications 47 maintained in the coupled storage devices 46. Optionally, the third party provider 45 sends the received third party token back to the authentication service 41 and asks the authentication service 41 for additional data about the user 11, 12 (step 63). Once received, this additional data can be compared to data stored in the coupled storage devices 46, with a further confirmation of the identity of the user 11, 12 being obtained upon the additional data matching the information stored in coupled storage devices 46. The additional information can also be used by the third party provider to determine whether to unlock additional features of the third party application; in a further embodiment, the additional capabilities can be unlocked based on the user name alone. Once the user identity is confirmed (step 62 and optionally step 63), the third party provider 45 can allow the user 11, 12 to access the third party application maintained by the third party provider, such as by letting the user interact with the application through the reader device 44 (step 64). Other ways of allowing the user to access the application are possible.

While the invention has been particularly shown and described as referenced to the embodiments thereof, those skilled in the art will understand that the foregoing and other changes in form and detail may be made therein without departing from the spirit and scope.

What is claimed is:

1. A computer-implemented method for electronic personal identity verification, comprising:
    establishing a biometric signature by an identification device worn by a user;
    registering the user with an authentication service comprising providing to the authentication service the biometric signature associated with the user and information personally known to the user;
    confirming by the authentication service that the biometric signature is associated with the user;
    periodically generating a dynamic key and periodically sending the generated dynamic key from the authentication service to the identification device worn by the user after performing the confirmation;
    forming identification data on the identification device, the identification data comprising the dynamic key and the biometric signature;
    sending the identification data comprising the biometric signature and the dynamic key from the identification device worn by the user to a user device associated with the user;
    receiving input personally known to the user into the user device;
    sending encrypted credentials comprising the user input and the identification data from the user device to the authentication service;
    comparing the received encrypted credentials to the biometric signature and the information provided to the authentication service during the registration;

sending a claims token from the authentication service to the user device upon the encrypted credentials matching the biometric signature and the information provided to the authentication service during the registration; and accessing an application that requires user identity verification via a third party provider using the claims token.

2. A method according to claim 1, further comprising:
sending the claims token from the user device to the third party provider;
verifying the claims token received by the third party provider with the authentication service;
sending a third party token from the authentication service to the third party provider;
confirming an identity of the user based on the received third party token; and
allowing access to the application upon the confirmation of the identity.

3. A method according to claim 2, further comprising:
sending by the third party provider the received third party token to the authentication service with a request for additional information;
sending the requested additional information from the authentication service to the third party provider; and
comparing the additional information to information stored by a storage associated with the third party provider,
wherein the confirmation of the identity of the user is further performed based on the additional information matching the information stored by the third party provider.

4. A method according to claim 1, further comprising:
storing the dynamic key most recently sent to the identification device worn by the user in a storage associated with the authentication service; and
comparing the encrypted credentials to the stored dynamic key,
wherein the claims token is sent to the user device upon the encrypted credentials further matching the stored dynamic key.

5. A method according to claim 1, further comprising:
detecting biometric data from a body of the user via a biometric sensor comprised at least one of in the identification device worn by the user and on the identification device worn by the user; and
generating the biometric signature by processing at the identification device worn by the user the detected biometric data.

6. A method according to claim 5, wherein the biometric sensor comprises at least one of a retina scanner, heart rate sensor, accelerometer, toe print scanner, fingerprint scanner, DNA analyzer, facial feature scanner, blood vessel pattern scanner, handwriting scanner, and a voice scanner.

7. A method according to claim 1, further comprising:
unlocking additional capabilities of the application based on the identification data.

8. A method according to claim 1, wherein the identification data further comprises at least one of the user's name, permissions, and location.

9. A method according to claim 1, wherein the identification device worn by the user comprises at least one of a wristband, ring, belt clip, bangle, necklace, earring, bandana, and glasses.

10. A computer-implemented system for electronic personal identity verification, comprising:
an identification device worn by a user to send identification data comprising a biometric signature to a user device associated with the user, wherein the identification device worn by the user establishes the biometric signature and forms the identification data on the identification device;
the user device to receive input personally known to the user and to send encrypted credentials comprising the user input and the identification data to an authentication service;
an authentication service configured to execute code, comprising:
a registration module to register the user, comprising a receipt module to receive the biometric signature associated with the user and information personally known to the user;
a confirmation module to confirm that the biometric signature is associated with the user;
a periodic module to periodically generate a dynamic key and periodically send the generated dynamic key to the identification device worn by the user after performing the confirmation, wherein the identification data formed on the identification device further comprises the dynamic key;
a comparison module to receive the encrypted credentials and to compare the received encrypted credentials to the biometric signature and the information provided to the authentication service during the registration; and
a sending module to send to the user device a claims token upon the encrypted credentials matching the biometric signature and the information provided to the authentication service during the registration; and
a third party provider to allow access to an application that requires user identity verification based on the claims token.

11. A system according to claim 10, wherein:
the user device further sends the claims token to the third party provider;
the third party provider verifies the claims token with the authentication service, receives a third party token from the authentication service upon the verification, confirms an identity of the user based on the received third party token, and allows access to the application upon the confirmation of the identity.

12. A system according to claim 11, wherein:
the third party provider sends the received third party token to the authentication service with a request for additional information, receives the requested additional information from the authentication service, and compares the additional information to information stored by a storage associated with the third party provider; and
the confirmation of the identity of the user is further performed based on the additional information matching the information stored by the third party provider.

13. A system according to claim 10, further comprising:
a storage associated with the authentication service to store the dynamic key most recently sent to the identification device worn by the user,
wherein the encrypted credentials are further compared to the stored dynamic key and the claims token is sent to the user device upon the encrypted credentials further matching the stored dynamic key.

14. A system according to claim 10, wherein the identification device worn by the user further comprises:
a biometric sensor to detect biometric data from a body of the user; and
a processor to generate the biometric signature by processing the user the detected biometric data.

15. A system according to claim 14, wherein the biometric sensor comprises at least one of a retina scanner, heart rate sensor, accelerometer, toe print scanner, fingerprint scanner, DNA analyzer, facial feature scanner, blood vessel pattern scanner, handwriting scanner, and a voice scanner.

16. A system according to claim 10, wherein additional capabilities of the application are unlocked based on the identification data.

17. A system according to claim 10, wherein the identification data further comprises at least one of the user's name, permissions, and location.

18. A system according to claim 10, wherein the identification device worn by the user comprises at least one of a wristband, ring, belt clip, bangle, necklace, earring, bandana, and glasses.

19. A computer-implemented method for electronic personal identity verification for application access, comprising:
   registering a user with an authentication service comprising providing to the authentication service a biometric signature associated with the user and information personally known to the user;
   sending identification data comprising the biometric signature from an identification device worn by the user to a user device associated with the user;
   receiving input personally known to the user into the user device;
   sending encrypted credentials comprising the user input and the identification data from the user device to the authentication service;
   comparing the received encrypted credentials to the biometric signature and the information provided to the authentication service during the registration;
   sending a claims token from the authentication service to the user device upon the encrypted credentials matching the biometric signature and the information provided to the authentication service during the registration; and
   accessing an application that requires user identity verification via a third party provider using the claims token, comprising:
      sending the claims token from the user device to the third party provider;
      verifying the claims token received by the third party provider with the authentication service;
      sending a third party token from the authentication service to the third party provider;
      confirming an identity of the user based on the received third party token; and
      allowing access to the application upon the confirmation of the identity.

* * * * *